(12) United States Patent
Sauvlet et al.

(10) Patent No.: US 7,731,626 B2
(45) Date of Patent: Jun. 8, 2010

(54) METHOD AND SYSTEM FOR CONTROLLING A HYBRID VEHICLE

(75) Inventors: Nils Sauvlet, Bad Essen (DE); Marco Fleckner, Leonberg (DE); Dieter Kraxner, Wurmberg (DE); Markus Goehring, Nufringen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 431 days.

(21) Appl. No.: 11/862,222

(22) Filed: Sep. 27, 2007

(65) Prior Publication Data

US 2008/0081729 A1    Apr. 3, 2008

(30) Foreign Application Priority Data

Sep. 28, 2006   (DE) ................. 10 2006 045 823

(51) Int. Cl.
*B60K 1/02* (2006.01)

(52) U.S. Cl. ................. 477/3; 477/15; 477/20

(58) Field of Classification Search ............. 477/3, 477/7, 15, 20
See application file for complete search history.

(56) References Cited

U.S. PATENT DOCUMENTS

| 6,201,312 | B1 | 3/2001 | Shioiri et al. |
| 7,192,374 | B2 * | 3/2007 | Kuras et al. ................. 475/153 |
| 7,314,426 | B2 * | 1/2008 | Imazu ........................... 477/6 |
| 7,632,212 | B2 * | 12/2009 | Yamanaka et al. .......... 477/107 |
| 7,637,846 | B2 * | 12/2009 | Tamai et al. ................. 477/110 |
| 2005/0246076 | A1 | 11/2005 | Chen et al. |

FOREIGN PATENT DOCUMENTS

| DE | 199 06 601 A1 | 9/1999 |
| DE | 101 46 318 A1 | 4/2003 |

* cited by examiner

*Primary Examiner*—Ha D. Ho
(74) *Attorney, Agent, or Firm*—Gerald E. Hespos; Michael J. Porco

(57) ABSTRACT

A system and method for controlling a hybrid vehicle drive has a device for detecting a charging power of a heavy-duty battery for an electric motor, a device for determining at least one fuel consumption parameter for several different transmission gear positions at the detected charging power and for determining an optimized gear position in which the determined fuel consumption parameter indicates an optimized fuel consumption. The determining device controls the gear position of the transmission to the determined optimized gear position by via a transmission control device.

6 Claims, 2 Drawing Sheets

METHOD AND SYSTEM FOR CONTROLLING A HYBRID VEHICLE

RELATED APPLICATIONS

This application claims priority from German patent application number DE 10 2006 045 823.0, filed Sep. 28, 2006, the disclosure of which is incorporated by reference herein in its entirety.

BACKGROUND AND SUMMARY OF THE INVENTION

The present invention relates to a method and a system for controlling a hybrid vehicle drive.

Hybrid vehicle drives have been on the market for some years as a consumption-reducing and environmentally friendly alternative to the conventional internal-combustion engine. By established general definition, a hybrid vehicle drive contains at least two different energy converters and two different energy accumulators. With a few exceptions, in a practical implementation, the converters involve an internal-combustion engine and an electric motor, and the energy accumulators are a combustible fuel and a battery.

In contrast to conventional vehicles having an internal-combustion engine, a hybrid vehicle has the advantage that it can recapture the braking energy for the most part (with the exception of the loss of efficiency). The recaptured or recuperated braking energy is intermediately stored in the battery of the electric motor, with the electric motor functioning as a mechanical-electrical converter.

An intermediate storage of energy (thus, the recuperation) occurs during active braking and in a coasting phase or operation in which the internal-combustion engine is not actively driving the vehicle because the driver's foot has been removed from the accelerator. The vehicle is therefore in a passive state and is propelled only by its own inert mass, until the diverse tractive resistances gradually decelerate it to a stop. In hybrid vehicle drives, the feeding of gasoline and the ignition are switched off in the coasting phase and technical measures are taken in order to stop the engine brake of the internal-combustion engine in the coasting operation. Thereby, the kinetic energy is caused to be supplied as completely as possible to the electric motor configured as a mechanical-electrical converter.

In a load point raising operation, the internal-combustion engine supplies a portion of its torque to the output and the remaining portion as the generator torque for the electric motor in order to thereby generate electric energy for the heavy-duty battery where the energy is stored. A disadvantage of the known hybrid vehicle drives was found to be that, in certain operating conditions, the load raising operation results in excessive fuel consumption.

An object of the present invention is to provide an improved method and system for controlling a hybrid vehicle drive that results in more fuel-saving during the battery charging operation.

The method according to the invention for controlling a hybrid vehicle drive and the corresponding system as hereinafter described have the advantage that the charging operation can be designed to be more flexible, and consumption advantages can therefore be achieved.

The present invention is based on the control calculating a fuel consumption parameter for the actual charging current of the battery for each gear, for example, the fuel mass flow rate, for several different gear positions of the transmission. By way of these gear-dependent fuel consumption parameters, the optimized gear with optimized fuel consumption, indicated by the respective fuel consumption parameter, such as the minimal fuel mass flow rate, is selected and is set by the transmission. Thus, the gear position is varied as a function of the operating point of the electric motor.

In the parallel hybrid—transmission line concept, during a constant travel with a constant wheel torque, the internal torque between the internal-combustion engine and the electric moment may be variable. In order to obtain an optimal operating point of the internal-combustion engine for the demanded actual charging current of the heavy-duty battery, according to the invention, in addition to the load of the internal-combustion engine and of the electric motor, the rotational speed of the assemblies is also varied by way of the gear selection.

According to a preferred further development, the fuel consumption parameter is a fuel mass flow rate. In another one of the currently preferred further developments, the determination of the least one fuel consumption parameter takes place for all gear positions of the transmission at the detected charging power.

Other objects, advantages and novel features of the present invention will become apparent from the following detailed description of the invention when considered in conjunction with the accompanying drawings.

DETAILED DESCRIPTION OF THE DRAWINGS

Figure 1:
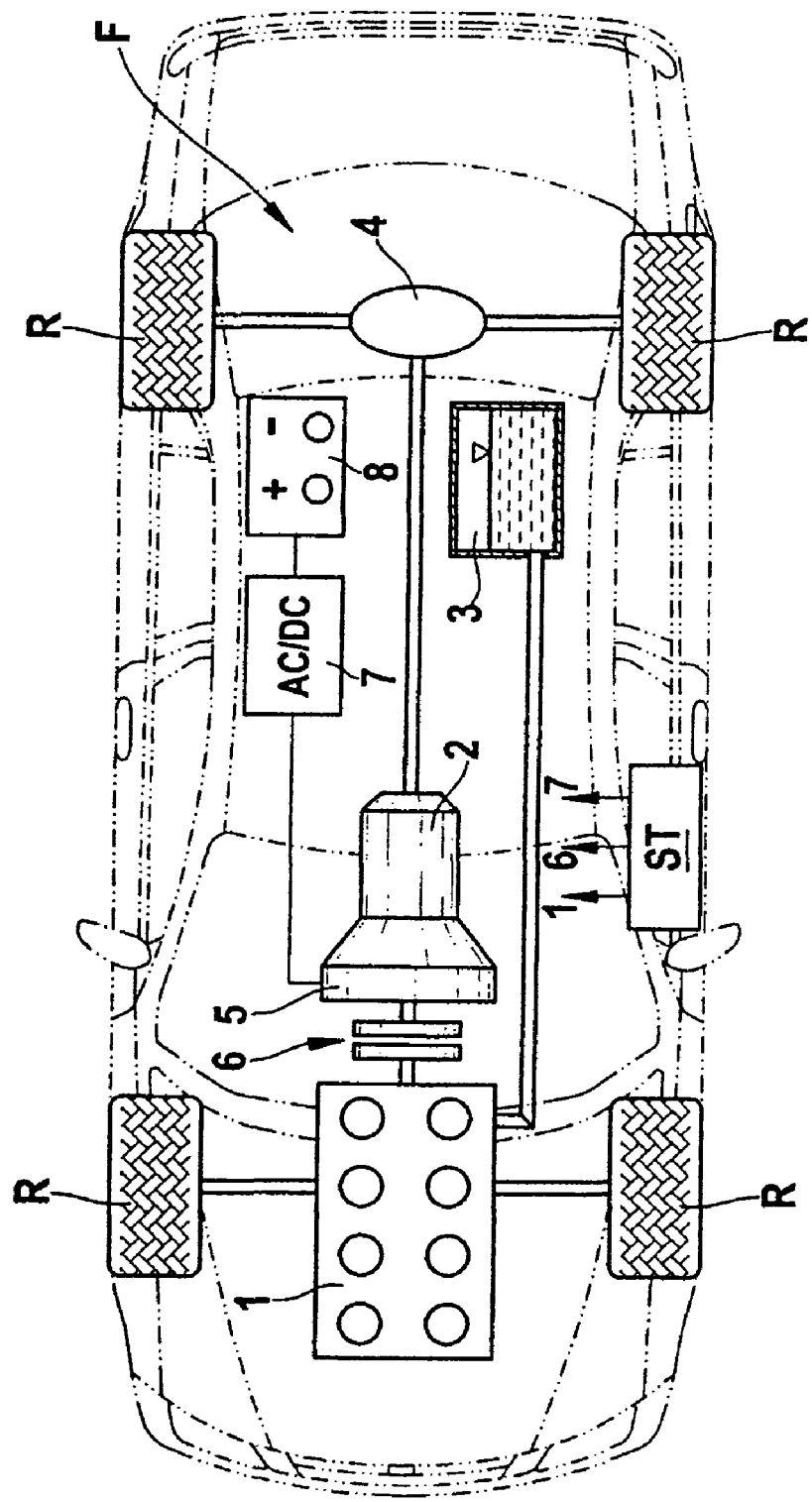
FIG. 1 is a schematic view of a hybrid vehicle drive employing the present invention.

In the drawing figures, the same reference numbers indicate identical elements or elements having the same function.

In FIG. 1, reference symbol F indicates a parallel hybrid vehicle drive whose transmission line acting upon the wheels R is composed of an internal-combustion engine 1, a separating clutch 6, an electric motor 5, a transmission 2 and a differential 4. A tank 3 stores fuel as an energy carrier for the internal-combustion engine 1. A heavy-duty battery 8 stores electric energy for the electric motor 5. A conversion control device 7 is connected between the heavy-duty battery 8 and the electric motor 5, and can operate bidirectionally. Specifically, the control device 7 can feed electric energy of the heavy-duty battery 8 to the electric motor in an electric driving mode, and it can convert alternating-current energy supplied by the electric motor 5 to a direct-current energy in a recuperation mode and can thereby charge the heavy-duty battery.

The hybrid vehicle drive F shown in FIG. 1 has the following driving modes:

Conventional internal-combustion engine drive without activation of the electric drive;

electric drive without activation of the conventional internal-combustion engine drive;

boosting, in which the internal-combustion engine drive is assisted by the electric drive;

recuperation, in which the kinetic energy of the vehicle is recuperated into electric energy for the heavy-duty battery 8 and the separating clutch 6 is opened;

load point raising operation, in which the internal-combustion engine 1 supplies a portion of its torque to the output and the remaining portion as a generator torque for the electric motor 5, in order to generate energy for the heavy-duty battery 8 by way of the electric motor 5 and to store this energy there.

A control device having the reference symbol ST in FIG. 1, as a function of the driving operation situation, controls the load point of the internal-combustion engine 1, the position of the separating clutch 6 as well as the conversion control device 7.

In order to achieve an optimal adjustment of the hybrid vehicle drive F for the respective operating situation, operating situation parameters, such as the rotational speed, the velocity, the accelerator operating degree, the engine load, etc., are fed to the control device ST by way of conventional detection devices (not shown), based on which, by way of defined control algorithms, the control device ST calculates the respectively optimal operating adjustment and correspondingly controls the internal-combustion engine 1, the separating clutch 6 and the conversion control device 7.

Figure 2:
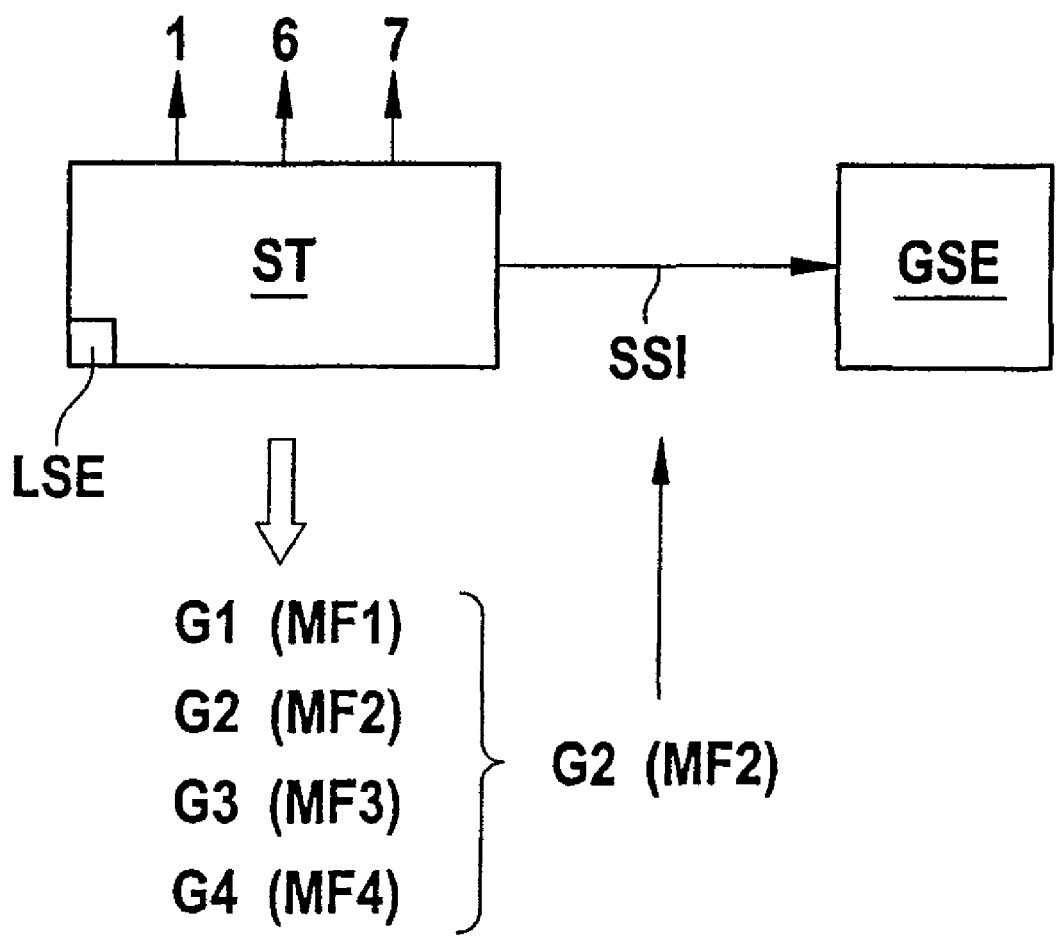
FIG. 2 is a block diagram of a first embodiment of a system for controlling a hybrid vehicle drive according to the present invention.

With reference to FIG. 2, a charging current detection device LSE is provided in connection with the control device ST to detect the actual charging current of the heavy-duty battery 8 of the electric motor 5.

Reference symbol GSE indicates a transmission control device controlling a four-position automatic transmission, (not shown) of the corresponding vehicle.

The control device ST is configured so that it can internally generate a transmission shifting signal SSI in order to thereby influence the gear selection by the transmission control device GSE.

Based on the detected actual charging power of the heavy-duty battery 8 for the electric motor 5, the control device ST calculates a pertaining fuel mass flow rate MF1, MF2, MF3, MF4 for each of the four gears G1, G2, G3, G4 of the transmission. The minimal fuel mass flow rate—in the present case, MF2—is determined from the computed fuel mass flows MF1-MF4. In other words, the minimal fuel mass flow rate MF2 assigned to gear position G2 indicates that the fuel consumption is minimal in this gear position. The control device ST correspondingly decides that, in the case of the determined actual charging current, the gear position G2 with the fuel mass flow rate MF2 is the optimal gear position and generates a corresponding transmission shifting signal SSI that is sent to the transmission control device GSE in order to thereby define the gear selection.

Although, in the above described embodiment, the determination of the at least one fuel consumption parameter takes place for all gear positions of the transmission at the detected charging power, a smaller gear range can also be used, for example, the momentary gear ±1.

The present invention is not limited to the fuel mass flow being provided as the fuel consumption parameter. Thus, different or additional parameters can be used for determining the fuel consumption and for the subsequent optimization such as fuel pressure signals or the like.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Method of controlling a hybrid vehicle drive having an internal-combustion engine, an electric motor and a transmission control device for controlling a gear position of a stepped automatic transmission, comprising:
   detecting a charging power of a heavy-duty battery for the electric motor,
   determining at least one fuel consumption parameter for several different gear positions of the transmission at the detected charging power,
   determining an optimized gear position in which the determined fuel consumption parameter indicates an optimized fuel consumption, and
   controlling the gear position of the transmission to the determined optimized gear position with the transmission control device.

2. Method according to claim 1, wherein the fuel consumption parameter is a fuel mass flow rate.

3. Method according to claim 1, wherein the determination of at least one fuel consumption parameter occurs for all gear positions of the transmission at the detected charging power.

4. System for controlling a hybrid vehicle drive having an internal-combustion engine, an electric motor and a transmission control device for controlling a gear position of a stepped automatic transmission, comprising:
   a first device configured to detect a charging power of a heavy-duty battery for the electric motor, and
   a second device configured to determine at least one fuel consumption parameter for several different gear positions of the transmission at a detected charging power, and for determining an optimized gear position in which the determined fuel consumption parameter indicates an optimized fuel consumption, wherein
   the second device is configured to control the gear position of the transmission to the determined optimized gear position via a transmission control device.

5. System according claim 4, wherein the fuel consumption parameter is a fuel mass flow rate.

6. System according to claim 4, wherein the second device is configured such that the determination of the at least one fuel consumption parameter occurs for all gear positions of the transmission at the detected charging power.

\* \* \* \* \*